United States Patent Office 2,777,743
Patented Jan. 15, 1957

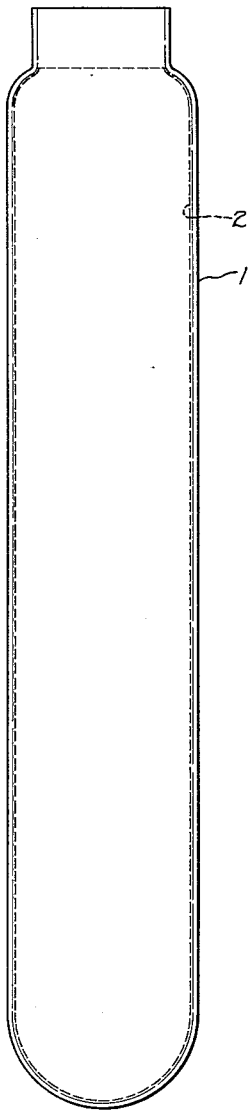
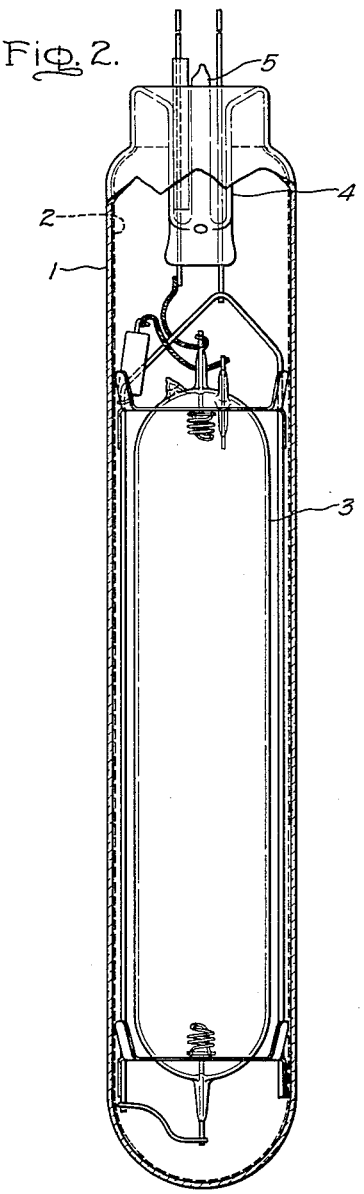

2,777,743
MANUFACTURE OF LAMPS WITH LUMINESCENT SCREENS

Robert S. Wells, Rugby, and Eric J. G. Beeson, Southwell, England, assignors to General Electric Company, a corporation of New York Application May 19, 1953, Serial No. 355,942

Claims priority, application Great Britain June 19, 1952

1 Claim. (Cl. 316—11)

This invention relates to the production of screens using luminescent compounds which emit radiation of wavelengths different from those by which they are excited.

Such compounds, generally known as phosphors, usually consist of a main constituent or matrix, often of a complex nature, which is rendered luminescent by the incorporation of one or more other elements or compounds, known as activators, by a crystallizing process, usually a heating process. This heating process may be carried out in a neutral, oxidizing, or reducing, atmosphere, according to the peculiar needs of the phosphor being prepared.

In the preparation of devices carrying or incorporating luminescent screens it is usual to heat these devices at one or more stages of their manufacture. For instance, the luminescent material is often applied in the form of a suspension in an organic binder solution, this binder is subsequently removed by a heating process in an oxidizing atmosphere usually at a temperature between 350° C. and 600° C. Furthermore, it is usual to bake such devices (as have been mentioned above) while being continually evacuated, to remove traces of adsorbed gas, water, etc. from the walls of the insides of the devices (which are ultimately usually sealed off either evacuated, or filled with predetermined suitable atmospheres of particular kinds). This process, commonly referred to as "outgassing," is usually carried out between 300° C. and 600° C.

It happens that some phosphors are impaired by the baking process used to remove the organic binder, particularly those that are prepared in a reducing atmosphere. Other phosphors, however, among which can be mentioned magnesium arsenate activated with manganese, are made less strongly luminescent if they are heated in vacuo during the "outgassing" process, referred to above.

We have found that these phosphors can be restored to their normally strongly luminescent condition if the "outgassing" process is terminated by flushing the device internally with pure dry oxygen, at a suitable pressure, as it cools from the "outgassing" temperature to a temperature below that harmful to the phosphor (in vacuo). Re-evacuation at the lower temperature does not harm the phosphor, nor have the internal walls of the device time to re-adsorb harmful quantities of gas.

The object of the invention is to provide a process for the formation of a luminescent screen employing a phosphor adversely affected by heat which will avoid or remove this disadvantage.

According to the invention, subsequent to the removal of the binder by heating in the presence of a gaseous atmosphere and baking under vacuum the luminescent quality of a phosphor is restored by flushing a device so coated with pure dry oxygen.

For a further understanding of the invention, reference may be had to the following detailed description and to the drawing wherein:

Fig. 1 is an elevation of a lamp bulb provided with a luminescent screen or coating; and Fig. 2 is an elevation of a completed lamp embodying the bulb of Fig. 1.

To illustrate the invention, a glass bulb 1 to be used as the outer jacket of a high pressure mercury vapor lamp is coated on its inner surface, as indicated at 2, with magnesium arsenate/manganese phosphor, using a suspension of the phosphor in a nitrocellulose binder solution.

After the solvent for the nitrocellulose has been allowed to evaporate, the nitrocellulose is removed by heating the bulb in air or oxygen at 400° C. to 500° C. for about five minutes.

The bulb 1 is sealed to the internal lamp structure, including a conventional mercury vapor arc tube 3 with its supporting structure and stem 4, and is subject to "outgassing" treatment, involving the heating of the whole lamp to 450° C. for five minutes while a vacuum is created within the bulb 1 by continuous pumping with a vacuum pump through the exhaust tube 5.

Pure dry oxygen is then admitted to the bulb 1 through the tube 5 to a pressure of about one-half atmosphere. This pressure is maintained while the bulb is allowed to cool to approximately 150° C.

The oxygen is then pumped out by the vacuum pump, and a suitable atmosphere admitted to the bulb at the requisite pressure, for instance $CO_2$, or nitrogen or argon at several centimeters pressure. The bulb is sealed off from the air by sealing the tube 5, and the lamp completed.

What we claim as new and desire to secure by Letters Patent of the United States is:

In the manufacture of an electric lamp comprising a glass bulb having its interior surface coated with a manganese-activated magnesium arsenate phosphor which is adversely affected by heating in vacuo during the step of outgassing, the method which comprises outgassing the lamp by baking it at an elevated temperature in the range of 300–600° C. while continually evacuating the lamp to remove occluded gases from the walls thereof, flushing the lamp with oxygen as it cools from the outgassing temperature to a temperature of approximately 150° C., and re-evacuating the lamp at the lower temperature before it has time to re-absorb harmful quantities of gas.

References Cited in the file of this patent
UNITED STATES PATENTS

| | | |
|---|---|---|
| 2,096,693 | Cox | Oct. 19, 1937 |
| 2,449,637 | Blake et al. | Sept. 21, 1948 |